United States Patent [19]

Kodama

[11] Patent Number: 4,754,347

[45] Date of Patent: Jun. 28, 1988

[54] BRAKE MECHANISM FOR MAGNETIC TAPE REEL MOUNTS IN A VIDEO TAPE RECORDER

[75] Inventor: Yoshimi Kodama, Kobe, Japan

[73] Assignee: Sanyo Electric Co., Ltd., Moriguchi, Japan

[21] Appl. No.: 912,294

[22] PCT Filed: Feb. 28, 1985

[86] PCT No.: PCT/JP85/00097

§ 371 Date: Sep. 12, 1986

§ 102(e) Date: Sep. 12, 1986

[51] Int. Cl.⁴ .......................................... G11B 15/665
[52] U.S. Cl. .......................................... 360/85; 360/95
[58] Field of Search .................................... 360/85, 95

[56] References Cited

U.S. PATENT DOCUMENTS

| 4,573,090 | 2/1986 | Tsuchiya | 360/85 |
| 4,635,146 | 1/1987 | Koda et al. | 360/85 |
| 4,652,948 | 3/1987 | Umeda | 360/85 |
| 4,661,864 | 4/1987 | Kuwajima | 360/85 |
| 4,663,681 | 5/1987 | Kodama | 360/96.3 |

FOREIGN PATENT DOCUMENTS

| A79053 | 5/1983 | European Pat. Off. |
| 49-66312 | 6/1974 | Japan . |
| 49-73110 | 7/1974 | Japan . |
| 50-10606 | 2/1975 | Japan . |
| 54-139818 | 9/1979 | Japan . |
| 57-20949 | 2/1982 | Japan . |
| 57-100659 | 6/1982 | Japan . |
| 57-135450 | 8/1982 | Japan . |
| 57-208659 | 12/1982 | Japan . |
| 58-80155 | 5/1983 | Japan . |
| 58-80161 | 5/1983 | Japan . |
| 58-218065 | 12/1983 | Japan . |

Primary Examiner—Robert S. Tupper
Attorney, Agent, or Firm—Armstrong, Nikaido, Marmelstein & Kubovcik

[57] ABSTRACT

A brake mechanism for magnetic tape reel mounts in a video tape recorder in which a tape is pulled out and stowed by stopping a take-up reel mount while rotating a supply reel mount at the time of loading and unloading. The mechanism is provided with an idler wheel capable of engaging with idler engagements of each of the reel mounts and a pair of brakes capable of simultaneously engaging with brake engagements of both reel mounts. The idler engagement of the supply reel and the brake engagement of the supply reel are connected means of a one way clutch. At the time of unloading, the pair of brakes are engaged with the brake engagements of both reel mounts while the idler wheel is engaged with the idler engagement of the supply reel mount to rotate only the supply reel mount.

2 Claims, 6 Drawing Sheets

BRAKE MECHANISM FOR MAGNETIC TAPE REEL MOUNTS IN A VIDEO TAPE RECORDER

BACKGROUND OF THE INVENTION

1. Field of the Invention

The present invention relates to magnetic tape reel mounts in a video tape recorder, hereinafter referred to as a "VTR", and more particularly, to a brake mechanism for reel mounts in a VTR in which a tape is pulled out and stored by stopping a take-up reel mount and by rotating a supply reel mount at the time of loading and unloading.

2. Description of the Prior Art

A conventional tape-loading mechanism for a VTR is disclosed in U.S. Pat. Nos. 4,115,825 and 4,426,668. In this type of mechanism for a VTR, it is desirable that the tape position be the same when the tape is reloaded for playing and recording as the position of the tape when it was previously unloaded. The reason for this is to make the last picture in the first playing operation and the initial picture in the second playing operation continuous and also to maintain the indication of a tape counter consistent.

Conventionally, to accomplish these purposes, only one of the supply and take-up reel mounts is braked and the other is rotated, whereby loading and unloading of the magnetic tape are accomplished.

Also, in the conventional VTR, the brakes are applied to both of the reel mounts at the time of stopping so as to prevent the tape from slackening, and are relased at the time of playing.

Conventional brake mechanisms have required the use of two brake systems, and this has caused complication of the mechanism.

SUMMARY OF THE INVENTION

The present invention was developed taking the above-mentioned problems into consideration. The object of the present invention is to provide a single brake mechanism which operates on both the supply and the take-up reel mounts simultaneously, which is of simple construction and which includes a one-way clutch by which the tape position doesn't change notwithstanding repeated loadings and unloadings. The object of the present invention is also to provide a brake mechanism for magnetic tape reel mounts of simple construction in which an idler wheel is brought into engagement with the reel mounts in a wedged fashion in the rotary direction of the reel mounts, whereby the reel mounts can be braked by the wedging action of the idler wheel.

The present invention provides a brake mechanism for magnetic tape reel mounts in a VTR of the type that receives magnetic tape stored on two reels rotatably mounted internally of a cassette which includes a tape supply reel mount and a take-up reel mount, each of the reel mounts including an idler engagement and a brake engagement portion, an idler wheel mounted for movement into engagement with either of the idler engagement portions of the tape reel mounts, means driving the idler wheel for selective rotation in opposite directions and a pair of brake means for simultaneously engaging and disengaging with the brake engagement portions of the tape reel mounts. A one-way clutch is provided to connect the idler engaging portion and the brake engaging portion of the tape supply reel mount and is operative to drivingly engage the idler engagement portion and the brake engagement portion only when the idler engagement portion rotates in one direction and permits the idler engagement portion of the tape supply reel mount to rotate independently of the brake engagement portion when the idler engagement portion rotates opposite to that one direction. Loading means are provided in the VTR for pulling the magnetic tape out of the cassette and disposing the tape in contact with a guide cylinder. At the time of unloading, the pair of brake means are actuated to engage the brake engagement portions of the supply and take-up reel mounts and the idler wheel engages the idler engagement portion of the tape supply reel mount and rotates that idler engagement portion to withdraw the magnetic tape from the guide cylinder by rewinding the magnetic tape on the tape supply reel mount.

Moreover, the brake mechanism of the present invention also includes means for wedging the idler wheel with the idler engagement of the tape take-up reel mount at the time of loading the magnetic tape in the VTR which permits the pair of brake means to be disengaged from the brake engagement portions of both tape reel mounts thereby permitting the tape supply reel mount to rotate freely and unwind tape as required by the loading means pulling tape out of the cassette.

The invention and the advantages provided thereby will be more fully understood with reference to the following detailed description of the preferred embodiment taken in conjunction with the accompany drawings.

BRIEF DESCRIPTION OF THE DRAWINGS

Hereinafter the present invention will be described in detail with reference to the accompanying drawings wherein.

DESCRIPTION OF THE PREFERRED EMBODIMENT

Figure 1:
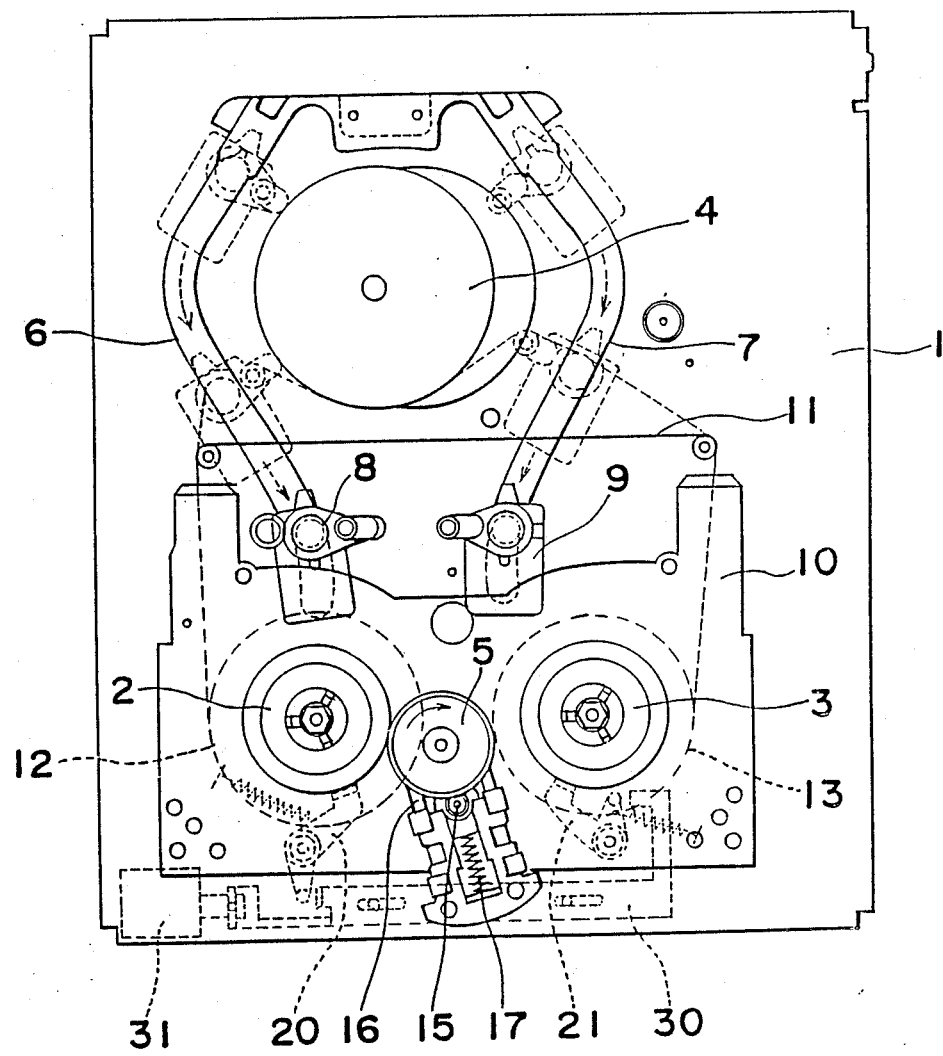
FIG. 1 is a plan view of a VTR tape loading mechanism in which the present invention is schematically shown.

Referring now to the drawings wherein the same reference numerals identify the same members throughout, FIG. 1 shows a tape-loading mechanism in a VTR, in which a tape supply reel mount 2, a tape take-up reel mount 3 and a guide cylinder 4 are mounted on a chassis 1. An idler wheel 5 is arranged between the tape reel mounts 2 and 3 and tape guides 8 and 9 are placed in each of a pair of guide grooves 6 and 7 respectively.

A tape cassette 10 is set on the chassis 1, with a supply reel 12 and a take-up reel 13 for a tape 11 fitting on the supply reel mount 2 and the take-up reel mount 3 respectively. When the tape 11 in the tape cassette 10 is pulled out of the cassette 10 by the tape guides 8 and 9, and wound onto the guide cylinder 4 and the take-up reel mount 3 is driven by the idler wheel 5, the tape 11 is recorded or reproduced. This type of loading and playing of the tape 11 is the same as that utilized in a conventional VTR.

The idler wheel 5 disposed between the supply reel mount 2 and the take-up reel mount 3 is driven by a drive pulley 15 to rotate selectively in a forward direction or the opposite direction and is swung so as to engage an idler engagement 2a of the supply reel mount 2 or an idler engagement 3a of the take-up reel mount 3. That is, the idler wheel 5, being supported by a support level 16 attached rotatably to a shaft of the drive pulley, is adapted to be able to be swung together with the support lever 16 around the shaft, while being pressed onto the drive pulley 15 all the time by a spring 17, so that the idler wheel 5 is rotated by the drive pulley 15. When the drive pulley 15 is driven in the forward direction, the idler wheel 5 is swung toward the idler engagement 3a of the take-up reel mount 3 and contacts the idler engagement 3a to rotate the take-up reel mount 3 clockwise as shown in the drawing. On the other hand, when the drive pulley 15 is rotated in the opposite direction, the idler wheel 5 is swung toward the idler engagement 2a of the supply reel mount 2 and contacts the idler engagement 2a, whereby the supply reel mount 2 is rotated counterclockwise in the drawing.

The direction the drive pulley 15 is driven is changed and controlled by a regular motor for forward and reverse rotation and a connection and change-over switch thereof (not shown). The driving force for rotating the drive pulley 15 can also be changed by switching over the voltage applied to the regular motor and thereby providing forward and reverse rotation.

Consequently, the idler wheel 5, as shown in FIG. 6(B), is engaged with the idler engagement 3a of the take-up reel mount 3 by a weak forward rotary force of the drive pulley at the time the tape 11 is loaded.

Figure 6:
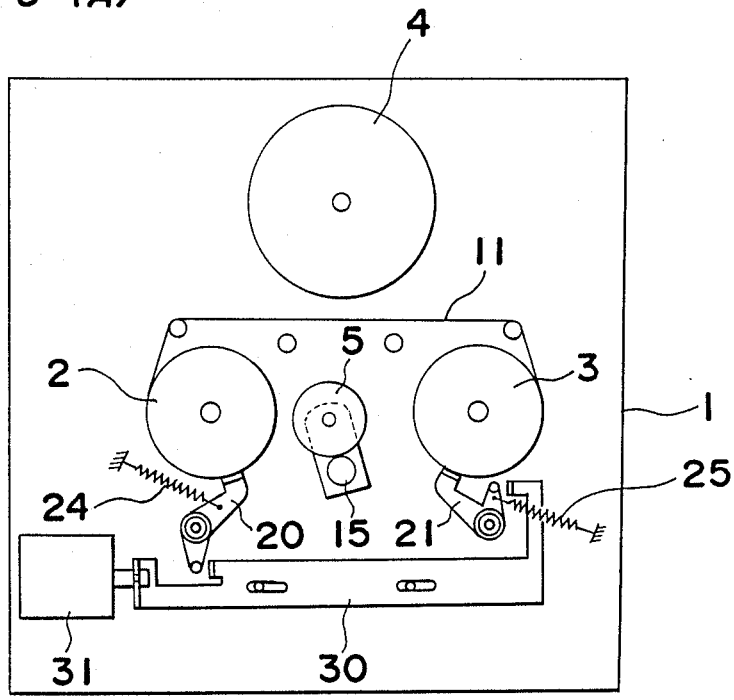
FIGS. 6(A–E) are plan views schematically illustrating the operation of the brake mechanism shown in FIG. 2 at the time of stopping, loading, playing, reverse reproducing and unloading the tape.
Figure 6:
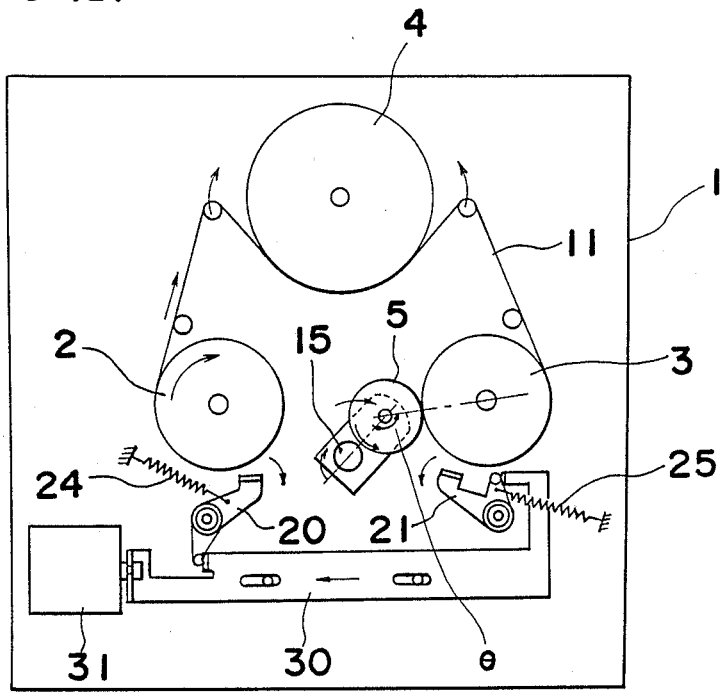
Figure 6C:
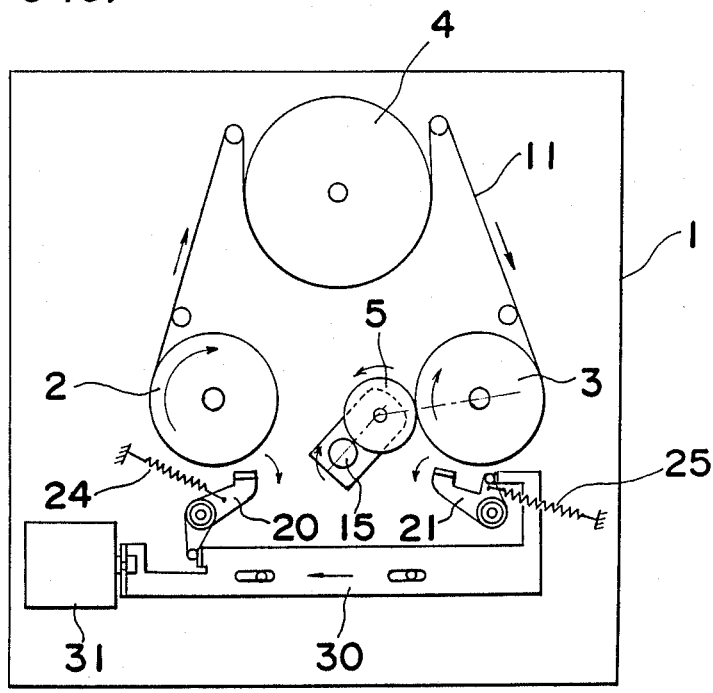
Figure 6D:
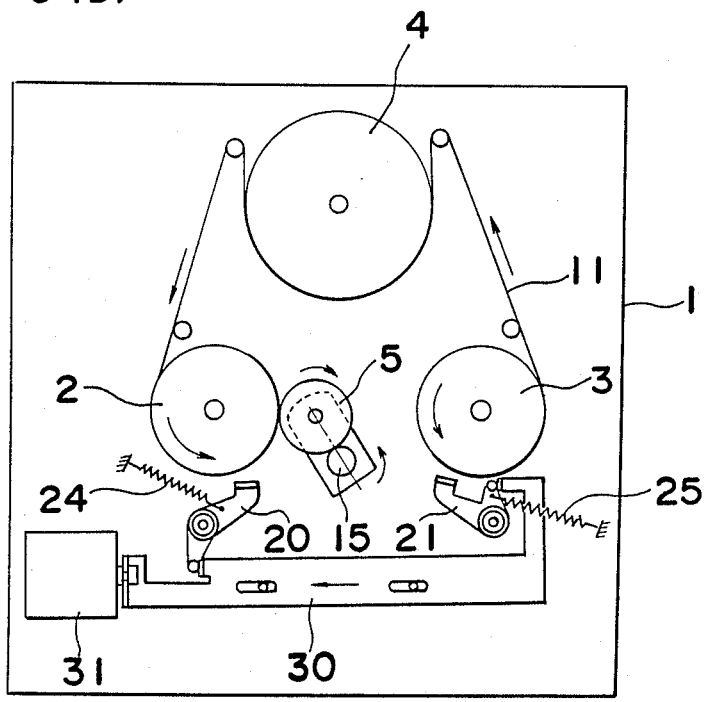
Figure 6E:
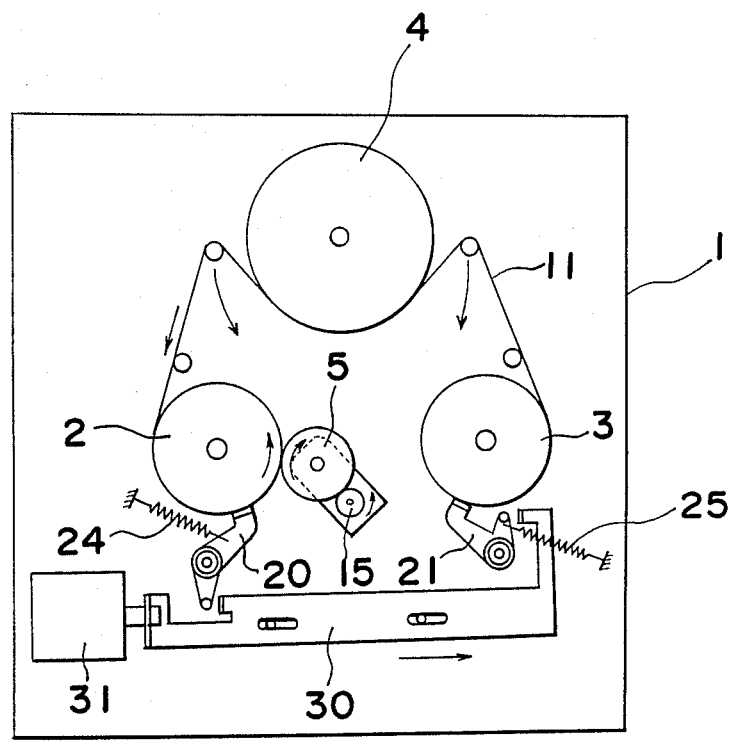

At the time of playing, as shown by FIG. 6(C), the idler wheel 5 is engaged with the idler engagement 3a of the take-up reel mount 3 by a strong forward rotary force of the drive pulley, whereby the take-up reel mount 3 is driven to rotate. At the time of unloading of the tape 1, as shown by FIG. 6(E) and of reverse reproducing, FIG. 6(D), the idler wheel 5 is engaged with the idler engagement 2a of the supply reel mount 2 by the counter or opposite rotation of the drive pulley, whereby the supply reel mount 2 is driven to rotate. The idler wheel 5 is released at the time of stopping as shown by FIG. 6(A).

The supply reel mount 2 and the take-up reel mount 3 include idler engagements 2a and 3a and brake engagements 2b and 3b respectively as will be described hereafter with reference to FIGS. 3 through 5.

Figure 2:
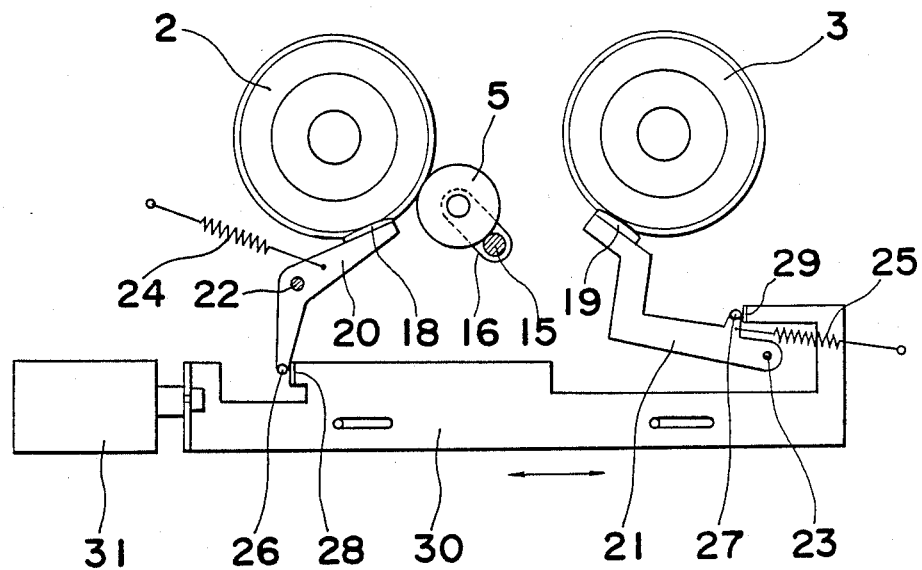
FIG. 2 is a plan view in which the brake mechanism of FIG. 1 is schematically shown.

Referring now to FIG. 2 where the reel mount mechanism is shown, brake shoes 18 and 19 are disposed facing the brake engagement 2b of the supply reel mount 2 and the brake engagement 3b of the take-up reel mount 3 respectively. Brake levers 20 and 21 with brake shoes 18 and 19 fitted thereto respectively are pivoted onto the chassis 1 by supporting shafts 22 and 23 respectively. The brake levers are also attached to coil springs 24 and 25, so that the brake levers can be pressed onto the brake engagements 2b and 3b through the brake shoes 18 and 19 by the force of the coil springs 24 and 25.

A brake release lever 30 having a pair of moving parts 28 and 29 facing engagement ends 26 and 27 of the brake levers 20 and 21 respectively is attached to a plunger 31 mounted on the chassis 1. When the plunger 31 is operated, the release lever 30 is moved in one direction and the engagement ends 26 and 27 of the brake levers 20 and 21 are pressed by the moving parts 28 and 29. The brake levers 20 and 21 are thus rotated around the shafts 22 and 23 against the spring force of the coil springs 24 and 25, whereby the pair of brake shoes 18 and 19 are released from the brake engagements 2b and 3b at the same time.

In other words, when the plunger 31 is out of operation, the brake shoes 18 and 19 of the pair of brake levers 20 and 21 are pressed onto the corresponding brake engagements 2b and 3b of the supply reel mount 2 and the take-up reel mount 3 respectively by the force of the coil springs 24 and 25, and the brakes are thus applied. On the other hand, when the plunger is in operation, the brake release lever 30 is put into operation, so that the brake shoes 18 and 19 of the pair of brake levers 20 and 21 will be separated from the brake engagements 2b and 3b of the corresponding supply reel mount 2 and the take-up reel mount 3 simultaneously so as to release the brakes. Consequently, the plunger 31 serves to change or switch over the brake. As shown by FIGS. 6(B-D), at the time of loading, playing and reverse reproducing of the tape 11, the brake shoes 18 and 19 are simultaneously released by putting the plunger into operation. At the time of stopping and unloading of the tape 11, as shown by FIGS. 6(A & E), the spring force of the coil springs 24 and 25 puts the brake shoes 18 and 19 in contact with the brake engagements 2a and 2b with the plunger out of operation.

Figure 3:
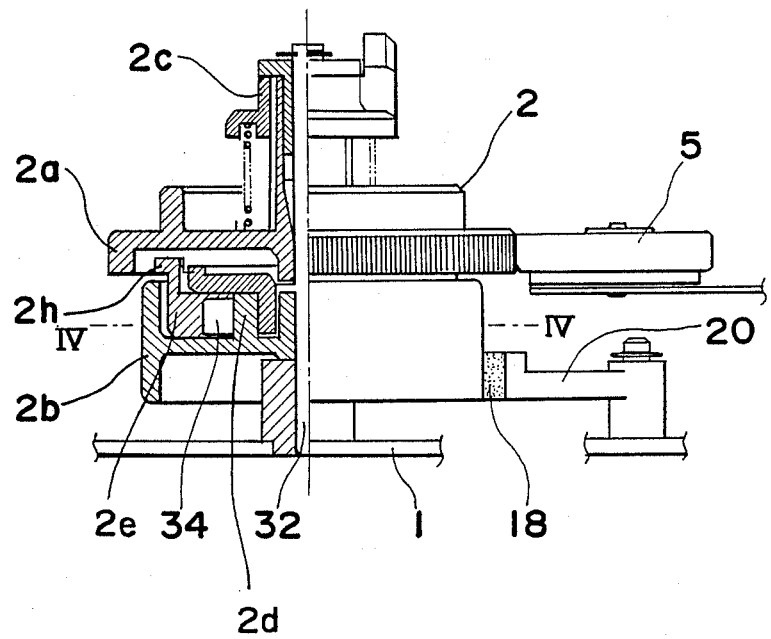
FIG. 3 is an elevational view, partly in section, showing a tape supply reel mount of FIG. 2.
Figure 4:
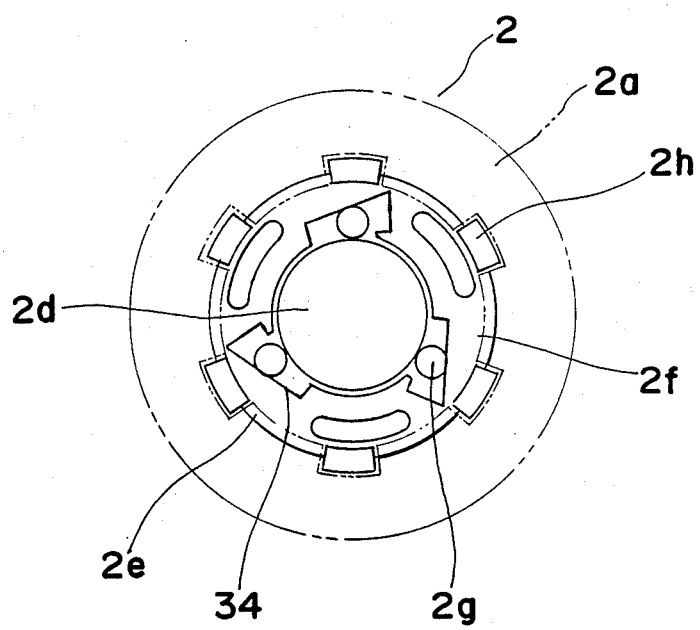
FIG. 4 is a transverse sectional view taken along the line IV—IV of FIG. 3.
Figure 5:
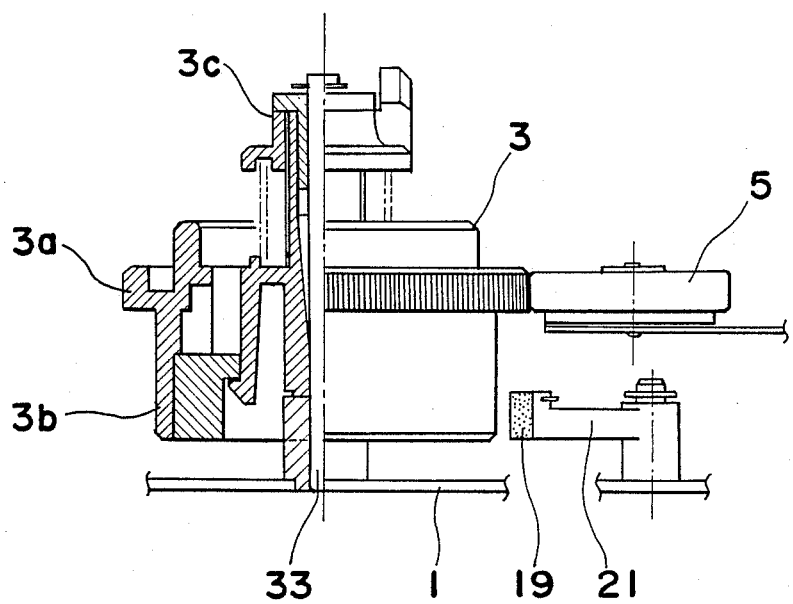
FIG. 5 is an elevational view, partly in section, showing a tape take-up reel mount of FIG. 2.

As shown in FIGS. 3 through 5, the supply reel mount 2 and the take-up reel mount 3 are rotatably provided on supporting shafts 32 and 33 arranged on the chassis 1 respectively.

As shown in FIG. 3, the supply reel mount 2 comprises a hub engagement 2c which a hub of the cassette supply reel (not shown) engages, an idler engagement 2a which rotates together with the hub engagement and which the idler wheel 5 engages, and a brake engagement 2b which the brake shoe 18 engages.

The idler engagement 2a and the brake engagement 2b are connected by a one-way clutch 34 as shown in FIG. 4. Thus, an annular body 2e is arranged radially outside of a cylindrical portin 2d integral with the brake engagement 2b. A plurality of rollers 2g are arranged in cam portions 2f formed at the radially inner side of the annular body 2e so as to be rotated in contact with the cylindrical portion 2d. A plurality of projecting portions 2h are formed integral with the radially outer edge of the annular body 2e and engage the radially inner side of the idler engagement 2a, so that the annular body 2e and the idler engagement 2a rotate together as one piece.

The one-way clutch 34 constructed as described above acts so that when the idler engagement 2a is rotated clockwise, the roller 2g will grip or bite between the cylindrical portion 2d and the annular body 2e, and the idler engagement 2a and the brake engagement 2b will rotate together as one piece. When the idler engagement 2a is rotated counterclockwise, the roller 2g is free to rotate and race and the coupling between the idler engagement 2a and the brake engagement 2b is released.

On the other hand, the idler engagement 3a and the brake engagement 3b of the take-up reel mount 3 shown in FIG. 5 are formed as integral parts of the same body so as to rotate together with a hub engagement 3c, which a hub (not shown) of the cassette take-up reel engages.

The movement of a VTR tape loading mechanism having the above-described structure will be described with reference to the various states of operation as shown by FIGS. 6(A–E).

When the tape loading mechanism is stopped as shown by FIG. 6(A), the drive pulley 15 is stopped and the plugner 31 is out of operation, enabling the brake shoes 18 and 19 to be pressed onto the brake engagements 2b and 3b of the supply reel mount 2 and the take-up reel mount 3 respectively by the coil springs 24 and 25.

When the tape loading mechanism is stopped, the take-up reel mount 3 is prohibited from rotating by the brake shoe 19. As for the supply reel 2, the idler engagement 2a is prohibited from rotating clockwsie, since the idler engagement 2a and the brake engagement 2b (and others) are integrally incorporated by the operation of the one-way clutch 34 as shown by FIG. 4 and the supply reel mount 2 is prohibited from rotating clockwise.

Consequently, the tape doesn't have any slack at the time of stopping, because on one hand the take-up reel mount 3 is stopped and on the other hand the supply reel mount 2 is prohibited from rotating clockwise.

When the playing operation is initiated after the stopping mode shown in FIG. 6(A), the drive pulley 15 starts to rotate clockwise by a weak force, whereby the idler wheel 5 is swung clockwise and comes into contact with the idler engagement 3a of the take-up reel mount 3. However, the force applying rotation to the drive pulley is small at this time and there is no possibility that the take-up reel mount will be rotated against frictional force of the brake. The plunger 31 is then actuated to slide the brake release lever 30 to the left by the suction of the plunger 31 and release the brake levers 20 and 21. After that, loading of the tape 11 is started, as shown in FIG. 6(B), by the succeeding movement of a loading means consisting of tape guides 8 and 9.

Now, the angle $\theta$ made between a line connecting the idler wheel 5 and the drive pulley 15 and a line connecting the idler wheel 5 and the take-up reel mount 3 is greater than 90° ($\theta > 90°$) as shown in FIG. 6(B), and the idler wheel 5 and the take-up reel mount 3 are located so that they are wedged into each other. Therefore at the time of loading, the take-up reel mount 3 will not be rotated because the idler wheel 5 serves as a brake holding the take-up reel mount 3 against rotation notwithstanding movement of the tape guides 8 and 9 and the tape 11 which would otherwise tend to rotate the take-up reel mount 3 counterclockwise.

Thus, the tape 11 is pulled out of the cassette 10 and loaded by rotating only the supply reel mount 2. As the drive pulley is applied a clockwise rotation by a weak force throughout the loading, the idler wheel 5 is continually in contact with the idler engagement 3a of the take-up reel mount 3, whereby the idler wheel 5 serves as a brake.

With the tape 11 loaded, the take-up reel mount 3 is rotated clockwise by the idler wheel 5 at the time of playing as shown by FIG. 6(C). At the time of reverse reproducing as shown by FIG. 6(D), the supply reel mount 2 is rotated counterclockwise by the idler wheel 5.

When the operation for unloading the tape 11 is initiated, the suction of the plunger 31 is released and the brake levers 20 and 21 engage the brake engagements 2b and 3b of the supply reel mount 2 and the take-up reel mount 3 respectively by the aid of the coil springs 24 and 25 as shown in FIG. 6(E).

Furthermore, the drive pulley 15 is driven to rotate counterclockwise and the idler wheel 5 is brought into engagement with the idler engagement 2a of the supply reel mount 2. Then, the idler engagement 2a and the supply reel 2 are rotated counterclockwise, since the idler engagement 2a can be rotated counterclockwise independently of the brake engagement 2b as permitted by operation of the one-way clutch 34 as shown in FIG. 4 even though the brake shoe 18 of the brake lever 20 engages the brake engagement 2b.

Therefore, at the time of unloading, the take-up reel mount 3 is stopped from rotating and the tape 11 is stowed in the cassette 10 with the rotation of only the supply reel mount 2.

In the event the tape on the supply reel runs short at the beginning of the loading operation or during the loading operation, and abnormal tension will be added to the tape with the above-described loading method. For this reason, a tape end detecting system (for example, an optical detector) is actuated in the disclosed embodiment as soon as the tape end is detected thereby, and even at the time of loading the mode of loading is changed to the mode of unloading.

As described above in detail with reference to the preferred embodiment, according to the present invention, one of the reel mounts is stopped at the time of loading and unloading without such brake mechanisms as are conventionally used to individually brake the supply reel mount and the take-up reel mount, and only the other of the reel mounts can be rotated, whereby deviation of a tape positon as previously caused by repetition of loading and unloading operations can be prevented with a simple mechanism.

Consequently, the brake mechanism of the reel mounts according to the present invention is industrially of great utility value in that it can be widely applied to various types of tape loading mechanisms in various systems of a VTR, and that it can provide a sure brake actuation and brake release function with the simple construction disclosed herein.

What is claimed is:

1. A brake mechanism for magnetic tape reel mounts in a video tape recorder of the type that receives magnetic tape stored on two reels rotatably mounted internally of a cassette comprising:

first and second tape reel mounts, said first and second tape reel mounts respectively including first and second idler engagement portions and first and second brake engagement portions, an idler wheel mounted for movement into engagement with either of said first and second idler engagement portions of said first and second tape reel mounts, means driving said idler wheel for selective rotation in opposite directions, a pair of brake means for simultaneously engaging and disengaging with said first and second brake engagement portions of said first and second tape reel mounts, a one-way clutch connecting said first idler engaging portion and said first brake engaging portion of said first tape reel mount and operative to drivingly engage said first idler engagement portion and said first brake engagement portion only when said first idler engagement portion rotates in one direction and permitting said first idler engagement portion of said first reel mount to rotate independently of said first brake engagement portion of said first reel mount when said first idler engagement portion rotates opposite to said one direction, and loading means for pulling the magnetic tape out of the cassette and disposing said tape in contact with a guide cylinder, whereby, at the time of unloading, said pair of brake means engage said first and second brake engagement portions of said first and second tape reel mounts while said idler wheel engages said first idler engagement portion of said first tape reel mount and rotates said first idler engagement portion in said direction opposite to said one direction to withdraw said tape from said guide cylinder by rewinding said magnetic tape on said first tape reel mount.

2. The brake mechanism for magnetic tape reel mounts as defined by claim 1 further including means for wedging said idler wheel with said second idler engagement portion of said second tape reel mount and whereby at the time of loading, said pair of brake means are disengaged from said first and second brake engagement portions of said first and second tape reel mounts and said idler wheel is engaged with said second idler engagement portion of said second tape reel mount and wedged to prevent rotation of said second tape reel mount while said first tape reel mount is free to rotate and unwind tape as required by said loading means pulling tape out of said cassette.

* * * * *